US008358776B1

(12) United States Patent
Basart

(10) Patent No.: US 8,358,776 B1
(45) Date of Patent: Jan. 22, 2013

(54) TELEPHONE MICROPHONE

(75) Inventor: Edwin Basart, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 136 days.

(21) Appl. No.: 13/076,773

(22) Filed: Mar. 31, 2011

(51) Int. Cl.
H04M 1/00 (2006.01)
(52) U.S. Cl. .................................. 379/420.03; 379/436
(58) Field of Classification Search ............ 379/420.03, 379/436
See application file for complete search history.

(56) References Cited

U.S. PATENT DOCUMENTS

| 6,108,416 | A | * | 8/2000 | Collin et al. | 379/433.03 |
| 7,190,802 | B2 | * | 3/2007 | Rains et al. | 381/369 |
| 7,542,575 | B2 | * | 6/2009 | DeLine et al. | 381/86 |
| 2003/0088398 | A1 | * | 5/2003 | Guo et al. | 704/8 |
| 2004/0117039 | A1 | * | 6/2004 | Hantke et al. | 700/17 |
| 2008/0015847 | A1 | * | 1/2008 | Lallouz et al. | 704/201 |
| 2009/0167542 | A1 | * | 7/2009 | Culbert et al. | 340/635 |

* cited by examiner

Primary Examiner — Creighton Smith
(74) Attorney, Agent, or Firm — Kilpatrick Townsend & Stockton LLP

(57) ABSTRACT

A telephone comprising one or more speaker apertures, a microphone indicator disposed on a user-facing surface of the telephone, and one or more microphone apertures disposed proximate to the microphone indicator on a surface of the telephone other than the user-facing surface, where at least one of the microphone apertures is operable to allow audio to pass from the user to a microphone disposed in the telephone, and where the microphone indicator is arranged to direct the user to speak in a direction toward at least one of the microphone apertures.

27 Claims, 16 Drawing Sheets

TELEPHONE MICROPHONE

BACKGROUND

Desktop and wall-mounted telephones have been in widespread use for a number of years. Such telephones typically employ handsets which include a speaker and a microphone for enabling users to communicate with others over the telephone. In modern desktop and wall-mounted telephones, these handsets are often complemented with additional speakers and microphones for enabling hands-free use of the telephone.

For the purposes of enabling hands-free use, speaker apertures which allow audio to pass from an internal speaker to the user are often large and clearly visible to the user. In contrast, with increasing innovations in reducing the size of electronic components, microphone apertures which allow audio to pass from the user to an internal microphone during hands-free use are becoming smaller and smaller, and accordingly less visible to the user. Adding to these reductions in size, technical advantages are realized by locating the microphone aperture precisely in locations which are even less visible to the user.

That is, for a number of years, desktop and wall-mounted telephones have been designed to include microphone apertures as close as possible to surfaces adjacent the telephone. For example, in desktop telephones, microphone apertures are often located on a bottom surface of the telephone only millimeters or centimeters from a desk surface on which the telephone rests. The reasoning behind such microphone aperture placement is to reduce echo problems.

Specifically, in hands-free use, a user does not put their mouth close to the microphone on a handset. Rather, the sound comes from the user's mouth, travelling much further and bouncing around off of the ceiling and walls, and in particular from the desk surface before reaching the microphone via the microphone aperture. This energy is fairly high and is known in the art as "desktop bounce." The microphone aperture and microphone are thus usually placed as close to the desk surface as possible, which will favor the energy coming straight from the user's mouth and, with luck, the energy that bounces off of the desktop will "miss," or, in other words, be at a lower level than that coming from the speaker's mouth.

The small size and discrete location of a microphone aperture for hands-free use makes it particularly challenging for user's to appropriately direct their speech to the microphone aperture. This problem is exaggerated by the typical inclusion of large, easily visible speaker apertures, which are often mistaken for microphone apertures. This problem is further exaggerated by the increased use of directional microphones which have high sensitivity for only a narrow range of directions.

Accordingly, there is a need for systems, apparatuses and methods for overcoming these and other problems in the art.

BRIEF SUMMARY

This invention relates to telephones, and in particular to microphone indicators on telephones for directing a user's speech toward a microphone aperture.

According to one embodiment, a telephone is provided which includes a user interface, one or more speaker apertures, a microphone indicator, and one or more microphone apertures. The user interface is disposed on a user-facing surface of the telephone, and is operable to input information from a user and output information to the user. The speaker apertures are disposed on a surface of the telephone. Often, although not always, the speaker apertures are also disposed on the user-facing surface. The microphone indicator is also disposed on the user-facing surface of the telephone, and is inoperable to process audio. The microphone apertures are disposed proximate to the microphone indicator on a surface of the telephone other than the user-facing surface. At least one of the microphone apertures is operable to allow audio to pass from the user to a microphone disposed in the telephone. The microphone indicator is arranged to direct the user to speak in a direction toward at least one of the microphone apertures.

These and other embodiments of the invention are described in further detailed below.

DETAILED DESCRIPTION

In accordance with embodiments of the present invention, a telephone is provided having a microphone indicator disposed proximate to a microphone aperture. The microphone indicator has a commonly recognizable appearance of a microphone. Because of its appearance, a user may believe that the microphone indicator is a microphone. Instead of processing audio, however, the microphone indicator acts as a marker to direct a user to speak in a particular direction (i.e., toward the microphone indicator). The corresponding microphone aperture, which is operable to process audio but which may not be as commonly recognizable as a microphone, is disposed on the telephone in a location where audio signals from a user speaking in a direction towards the microphone indicator can optimally be received.

As used herein, a "telephone" is any device enabling voice communications. The device may be a telephone including at least one of a handset, keypad, and display. The device may be a desktop device, wall-mounted device, or the like. The device may comprise only elements for receiving audio from a user, communicating the received audio for transmission to a third party, receiving audio from a third party, and communicating received audio to the user. Accordingly, the device may be a speaker/microphone combination. The device may be enabled to communicate audio over any medium, such as twisted pair landlines, the Internet, wireless mediums, and the like.

Figure 1A:
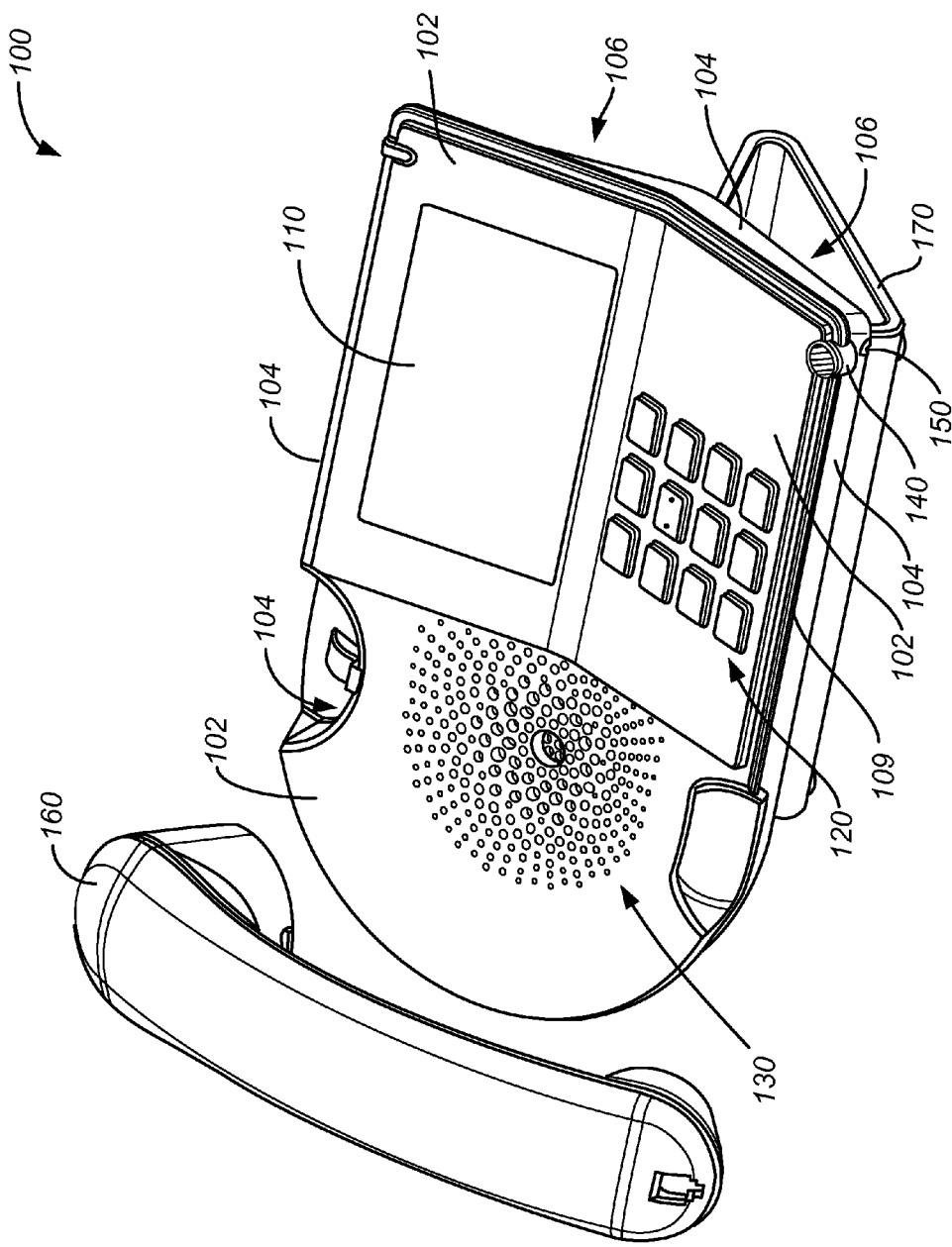
FIG. 1A is a profile view of a telephone having a microphone indicator, according to an embodiment of the invention.

FIG. 1A is a profile view of a telephone having a microphone indicator, according to an embodiment of the present invention. Telephone 100 includes a plurality of surfaces, such as user-facing (or front) surfaces 102, side surfaces 104, and rear surfaces 106. User-facing surfaces 102 may be flush with one another (e.g., located in the same plane), or they may be offset from one another by a predetermined angle (e.g., by less than 90 degrees). Similarly, other surfaces, such as rear surfaces 106, may also be flush with or offset from one another. Side surfaces 104 may be flush or offset from one another, but are more commonly offset by approximately 90 degrees. User-facing surfaces 102 may be arranged in a direction facing the user during normal operation of telephone 100. Bottom surfaces 106 may be arranged opposite user-facing surfaces 102.

Telephone 100 may further include a user interface disposed on user-facing faces 102 that is operable to at least input information from a user and, in some embodiments, also output information to the user. According to one embodiment and with reference to FIG. 1A, the user interface may include a display screen 110 operable to visually display information to the user and an alphanumeric keypad 120 operable to receive alphanumeric inputs from the user. Keypad 120 may include one or more elements (i.e., buttons) for receiving information from the user. For example, keypad 120 may include numerical buttons 0 to 9. For another example, keypad 120 may include functional buttons for increasing and/or decreasing a volume, activating or deactivating a mute functionality, enabling or displaying hands-free operation, accessing functions displayed via display screen 110, and the like.

According to some embodiments, the user interface consists of a display screen 110 which has a touch-sensitive surface, such that display screen 110 is operable to both visually display information to the user and receive inputs from the user. For example, display screen 110 may electronically generate and display a keypad such that display screen 110 is operable to receive alphanumeric inputs from the user.

According to some embodiments, display screen 110 is provided on a user-facing surface that is flush with a user-facing surface which alphanumeric keypad 120 is provided on. According to other embodiments, display screen 110 is provided on a user-facing surface that is offset from a user-facing surface which alphanumeric keypad 120 is provided on. For example, the user-facing surfaces may be offset by up to 45 degrees or more.

According to some embodiments, the user interface includes only keypad 120. According to other embodiments, the user interface includes only display screen 110.

Telephone 100 further includes one or more speaker apertures disposed on a surface of the telephone, where at least one of the speaker apertures is operable to allow audio to pass from a speaker disposed in the telephone to the user. One or more speakers may be provided for communicating audio through one or more speaker apertures. According to one embodiment and with reference to FIG. 1A, telephone 100 includes a plurality of speaker apertures 130. Each aperture has an approximately circular shape, although embodiments of the invention are not so limited. For example, the speaker apertures may be any shape, such as a square, rectangular, oval and the like.

According to some embodiments, speaker apertures 130 may be arranged in a variety of different shapes. For example, with reference to FIG. 1A, speaker apertures 130 may be arranged to form the shape of a circle. In other examples, the speaker apertures may be arranged in any shape, such as a square, rectangle, oval and the like.

According to some embodiments, speaker apertures 130 may be of the same size or of different sizes. For example, with reference to FIG. 1A, speaker apertures 130 may the same and different sizes. That is, they may be sized such that a diameter of the speaker apertures increases toward the center of the circle, but stays the same along circumferences of the arrangement. In other examples, speaker apertures 130 all have the same diameter.

According to some embodiments, speaker apertures 130 are provided on surfaces of telephone 100 other than a user-facing surface 102. For example, speaker apertures 130 may be provided on a side surface 104, or a bottom surface 106 of telephone 100. In other embodiments, speaker apertures 130 may be provided on a plurality of surfaces. For example, speaker apertures 130 may be provided on both a user-facing surface 102 and a side surface 104.

Telephone 100 further includes one or more microphone indicators 140 disposed on a user-facing surface 102, and one or more microphone apertures 150 disposed proximate to microphone indicator 140 on a surface other than the user-facing surface 102. Microphone indicator 140 is inoperable to process audio, and is arranged to direct the user to speak in a direction toward at least one of the microphone apertures. In some embodiments, microphone indicator is functionally independent from the microphone. At least one of the microphone apertures is operable to allow audio to pass from the user to a microphone disposed in the telephone.

As described above with respect to speaker apertures 130, each microphone aperture 150 may have one of a variety of shapes. If a plurality of microphone apertures 150 are provided, they may be arranged in a variety of different shapes, and may be of the same size or of different sizes. According to some embodiments, one or more microphones may be provided for receiving audio communicated through one or more microphone apertures.

According to one embodiment and with reference to FIG. 1A, microphone indicator 140 may be disposed along an edge 109 of a user-facing surface 102 of telephone 100 and extend downward along a side surface 104 of the telephone. Microphone indicator 140 may include a top disposed along edge 109, and a side extending downward from the top along side surface 104. The top of microphone indicator 140 may be substantially flat and the side of microphone indicator 140 may be curved and protrude outward from side surface 104. In one embodiment, the top of microphone indicator 140 has a mesh-like surface. In another embodiment, the top of microphone indicator 140 comprises a plurality of apertures. In some embodiments, microphone indicator 140 or portions of microphone indicator 140 may be made of metal. In other embodiments, microphone indicator 140 or portions of microphone indicator 140 may be made of materials other than metal (e.g., plastic) but have a metallic appearance. In some embodiments, microphone indicator 140 may be formed to be a solid piece of material. In other embodiments, microphone indicator 140 may be formed to be hollow.

According to one embodiment and with reference to FIG. 1A, microphone indicator 140 is spaced from a microphone aperture 150 located on a side surface 104 adjacent user-facing surface 102 of telephone 100. For example, microphone indicator 140 may be located no more than approximately 10 cm from microphone aperture 150.

Telephone 100 may further include a handset 160. Handset 160 may include at least one speaker and microphone to respectively output audio to and receive audio from the user. In one embodiment, handset 160 is physically coupled to other elements of telephone 100 by a wire to enable communication to the other elements of telephone 100. In another embodiment, handset 160 includes wireless circuitry to enable communication with other elements of telephone 100. Telephone 100 may further include a processor (not shown), storage device (not shown), software code (not shown), and the like for performing all of the functions concerning telephone 100 described herein.

Telephone 100 may further include a base 170. Base 170 functions to support other elements of telephone 100 such as the user interface. Base 170 may be arranged to directly contact a supporting structure such as a desk or wall, may be physically coupled to the other elements of telephone 100, and may be operable to selectively couple telephone 100 to the supporting structure.

Base 170 may have one or more shapes. For example, base 170 may be triangular, square, rectangular, trapezoidal, or the like. Base 170 may be adjustable. For example, base 170 may be adjustable to alter an angle of the telephone 100 relative to the supporting structure such as a desk or wall. This may alter a position of the microphone aperture 150 relative to the supporting structure. The angle may be fixed at predetermined angles, e.g., 5 degrees, 10 degrees, 15 degrees, etc. The angle may be variable, e.g., at a range of 0 degrees to 15 degrees. The angle may be anywhere from 0 degrees to 90 degrees. In some embodiments, the angle is greater than 90 degrees.

Base 170 may be physically coupled to other elements of telephone 100 in one or more arrangements. In one embodiment, base 170 may be coupled to other elements of telephone 100 in a first arrangement causing a user-facing surface 102 to be at a first predetermined angle relative to the supporting structure such as a desk or wall. Alternatively, base may be coupled to other elements of telephone 100 in a second arrangement causing the user-facing surface 102 to be at a second predetermined angle relative to the supporting structure, where the second predetermined angle is different than the first predetermined angle. For example, the difference may be 5 degrees, 10 degrees, 15 degrees, etc.

Figure 1B:
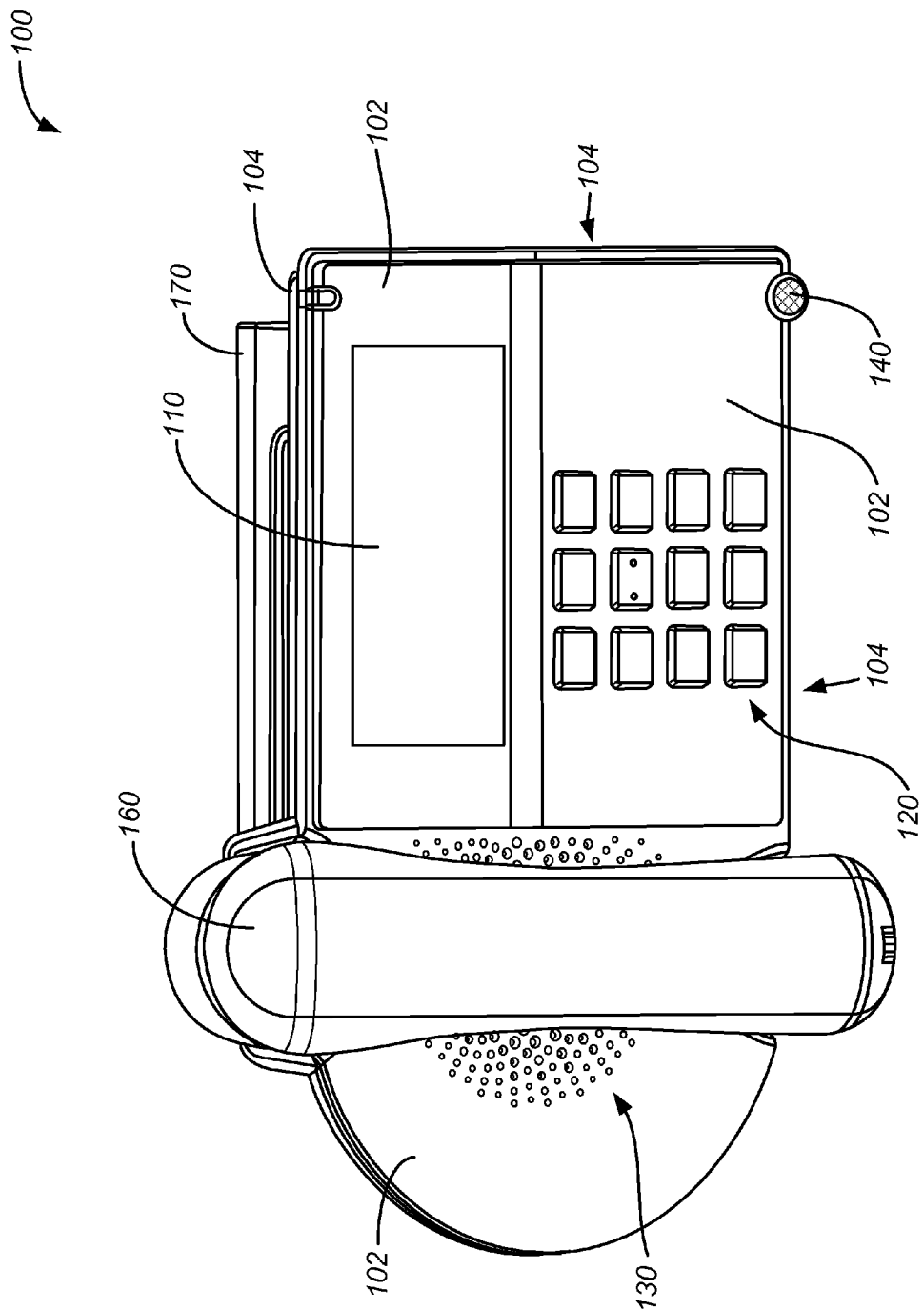
FIG. 1B is a top view of a telephone having a microphone indicator, according to an embodiment of the invention.

FIG. 1B is a top view of a telephone having a microphone indicator, according to an embodiment of the invention. In contrast to the embodiment illustrated in FIG. 1A where the optional handset 160 is provided in an unmounted configuration, in the embodiment illustrated in FIG. 1B the optional handset 160 is provided in a mounted configuration. In this view, the top of microphone indicator 140 according to an embodiment is clearly visible.

Figure 1C:
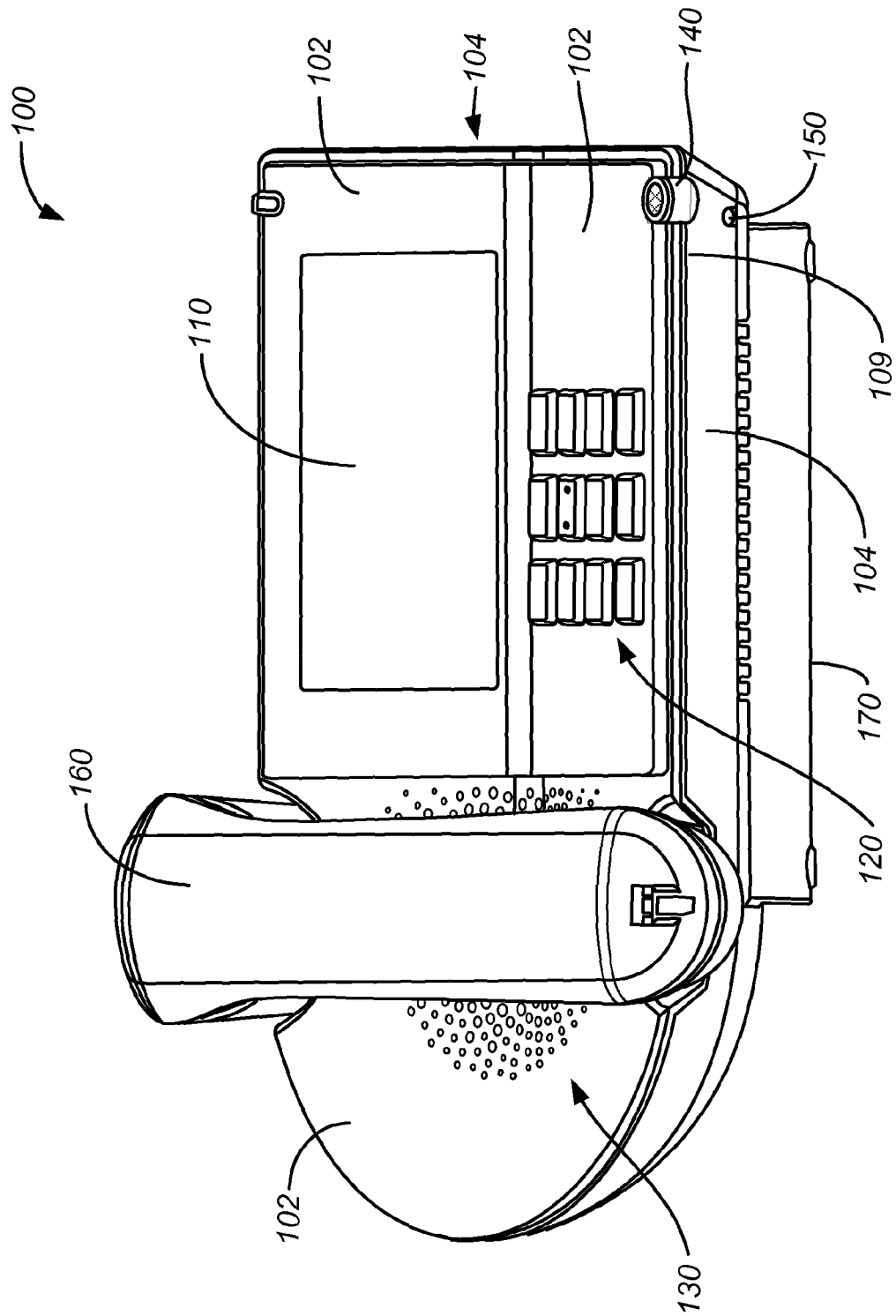
FIG. 1C is a front view of a telephone having a microphone indicator, according to an embodiment of the invention.

FIG. 1C is a front view of a telephone having a microphone indicator, according to an embodiment of the invention. In this view, microphone aperture 150 and sides of microphone indicator 140 according to an embodiment are clearly visible. In this view, microphone aperture 150 is arranged on side surface 104 of telephone 100.

Figure 1D:
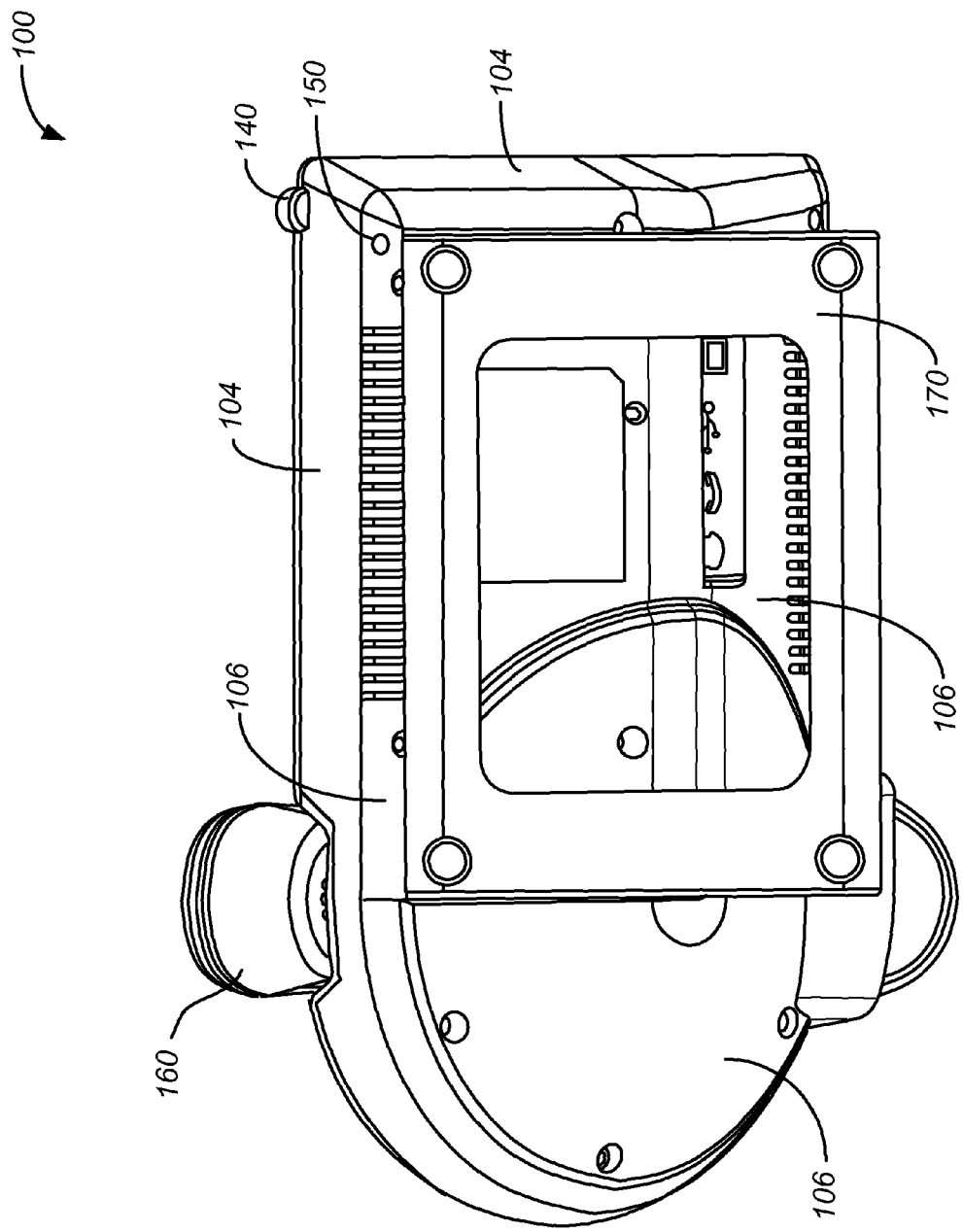
FIG. 1D is a bottom view of a telephone having a microphone indicator, according to an embodiment of the invention.

FIG. 1D is a bottom view of a telephone having a microphone indicator, according to an embodiment of the invention. In this view, microphone aperture 150 and rear surfaces 106 according to an embodiment are clearly visible. In this view, microphone aperture 150 is arranged on rear surface 106 of telephone 100.

Figure 2A:
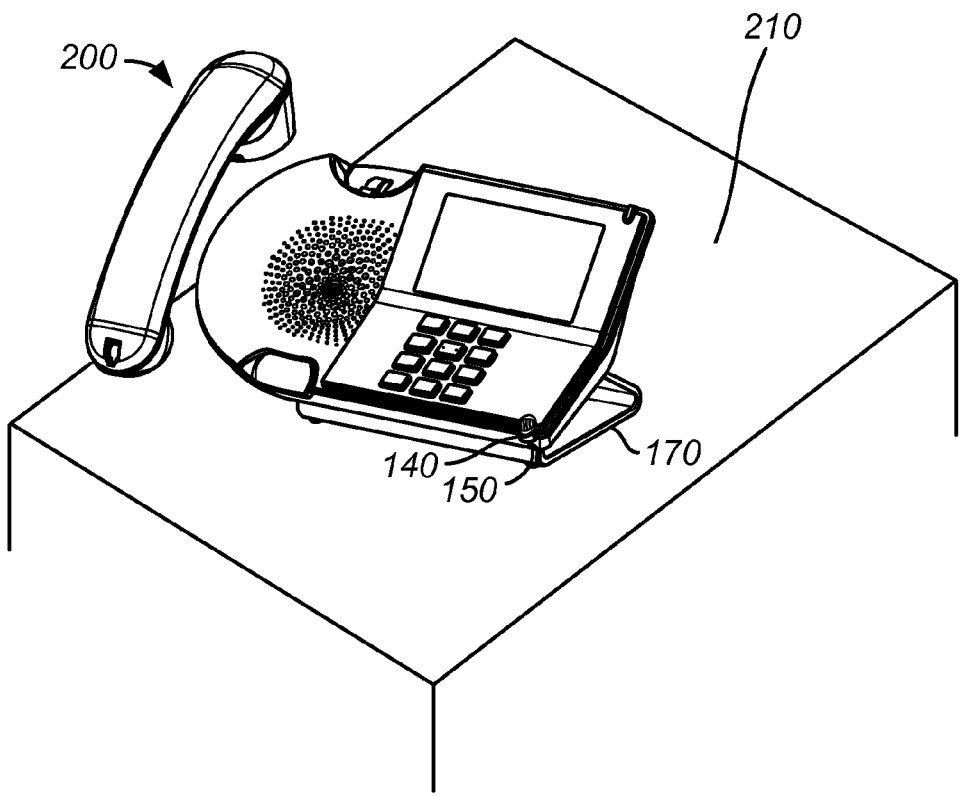
FIG. 2A is a diagram of a desk-mounted telephone having a microphone indicator, according to an embodiment of the invention.

FIG. 2A is a diagram of a desk-mounted telephone having a microphone indicator, according to an embodiment of the invention. Desk-mounted telephone 200 may include all of the components and features previously described with reference to telephone 100. For example, desk-mounted telephone 200 may include a base 170, one or more microphone indicators 140, and one or more microphone apertures 150. As previously discussed, various advantages arise when a microphone is located as close as possible to a resting surface. For example, desktop bounce may be reduced when desk-mounted telephone 200 is designed such that microphone aperture 150 is located as close as possible to a resting surface 210 of a desk (e.g., the surface supporting base 170). Thus, base 170 may be arranged to minimize a space between microphone aperture 150 and resting surface 210. For example, base 170 may be arranged to provide a space of between approximately 1 cm and 5 cm between microphone aperture 150 and resting surface 210.

Figure 2B:
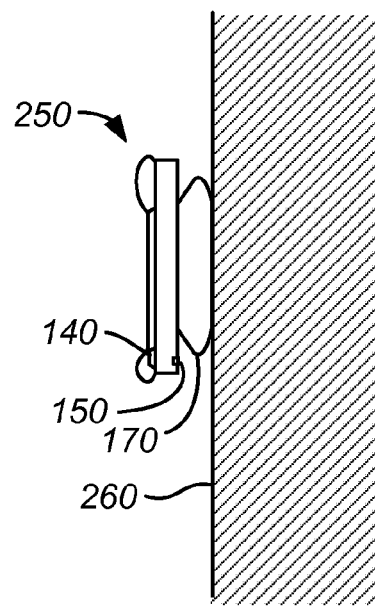
FIG. 2B is a diagram of a wall-mounted telephone having a microphone indicator, according to an embodiment of the invention.

FIG. 2B is a diagram of a wall-mounted telephone having a microphone indicator, according to an embodiment of the invention. Wall-mounted telephone 250 may include all of the components and features previously described with reference to telephone 100. For example, wall-mounted telephone 250 may include a base 170, one or more microphone indicators 140, and one or more microphone apertures 150. As previously discussed, various advantages arise when a microphone is located as close as possible to a resting surface. For example, desktop bounce may be reduced when wall-mounted telephone 250 is designed such that microphone aperture 150 is located as close as possible to a resting surface 260 of a wall. Thus, base 170 may be arranged to minimize a space between microphone aperture 150 and resting surface 260. For example, base 170 may be arranged to provide a space of between approximately 1 cm and 5 cm between microphone aperture 150 and resting surface 260.

Figure 3A:
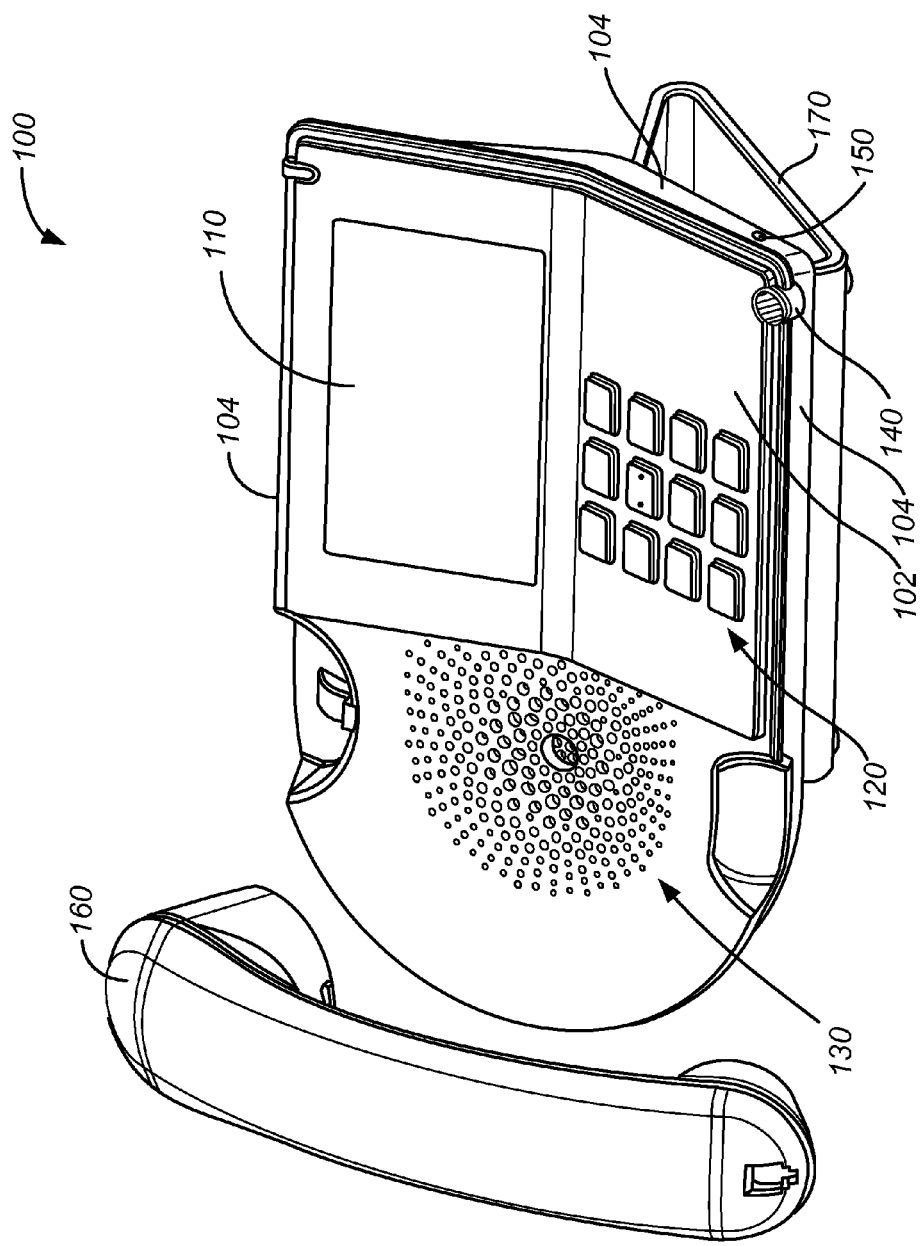
FIG. 3A is a diagram of a telephone having a microphone aperture located on a side surface of the telephone, according to an embodiment of the invention.

FIG. 3A is a diagram of a telephone having a microphone aperture located on a side surface of the telephone, according to an embodiment of the invention. According to some embodiments, one or more microphone apertures 150 may be disposed on one or more of side surfaces 104. For example, with reference to FIG. 1A microphone aperture 150 may be disposed on a side surface 104 perpendicular to user-facing surface 102 and the same as a side-surface 104 along which microphone indicator 140 is disposed. With reference to FIG. 3A, microphone aperture 150 may be disposed on a side surface 104 perpendicular to user-facing surface 102 and perpendicular to a side-surface 104 along which microphone indicator 140 is disposed.

Figure 3B:
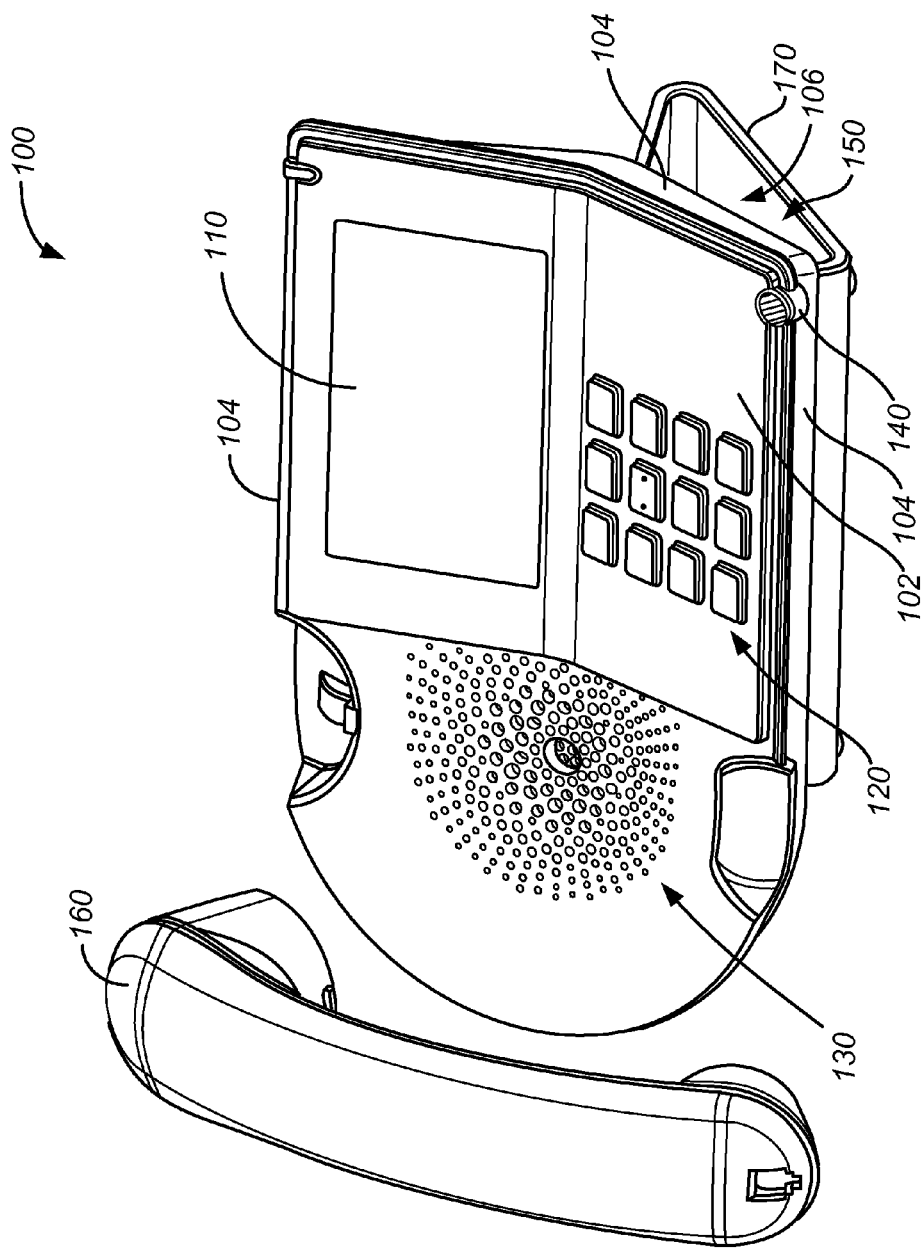
FIG. 3B is a diagram of a telephone having a microphone aperture located on a rear surface of the telephone, according to an embodiment of the invention.

FIG. 3B is a diagram of a telephone having a microphone aperture located on a rear surface of the telephone, according to an embodiment of the invention. According to some embodiments, one or more microphone apertures 150 may be disposed on surfaces of telephone 100 other than side surfaces 104. For example, with reference to FIG. 3B microphone aperture 150 may be disposed on a rear surface 106 of telephone 100.

Figure 4A:
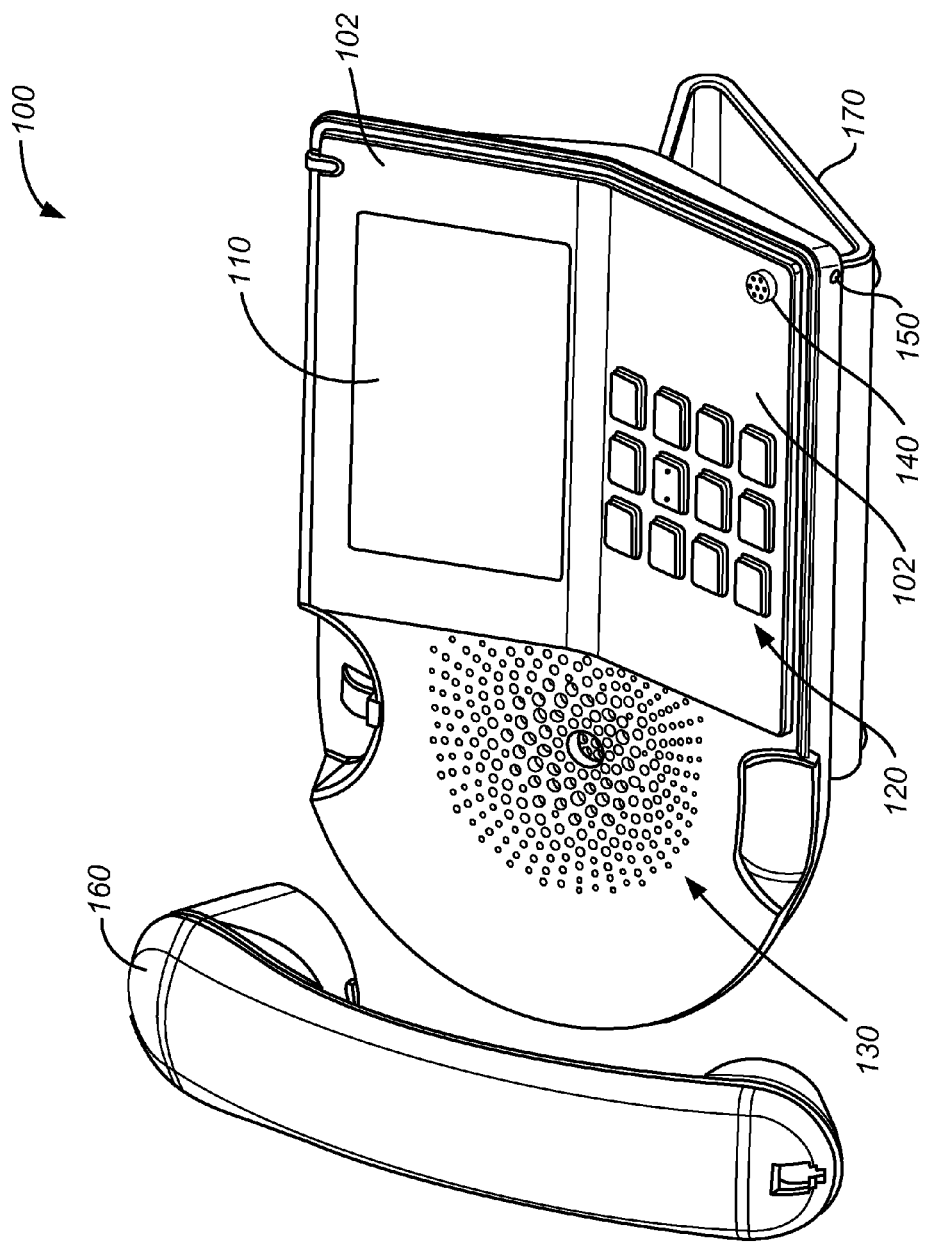
FIG. 4A is a diagram of a telephone having a microphone indicator protruding from a user-facing surface of the telephone, according to an embodiment of the invention.

FIG. 4A is a diagram of a telephone having a microphone indicator protruding from a user-facing surface of the telephone, according to an embodiment of the invention. According to some embodiments, microphone indicator 140 may protrude from a surface of telephone 100. For example, with reference to FIG. 4A, microphone indicator 140 may protrude from user-facing surface 102 which includes keypad 120. Microphone indicator 140 may include a substantially flat top and curved sides which extend between the top and the user-facing surface 102, and other characteristics as previously discussed. Microphone aperture 150 is disposed proximate to protruding microphone indicator 140.

Figure 4B:
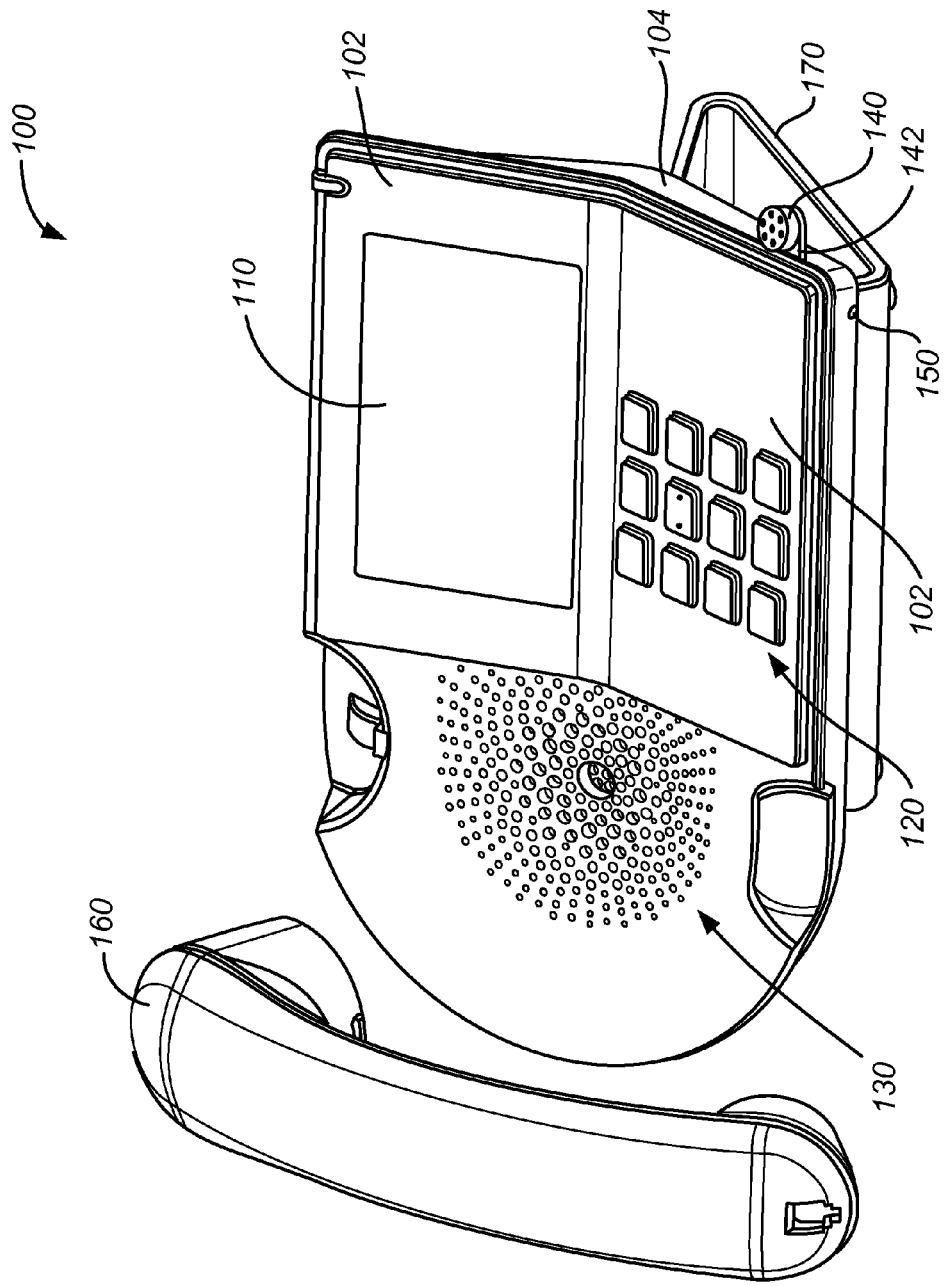
FIG. 4B is a diagram of a telephone having a microphone indicator provided on an extension extending from a side surface of the telephone, according to an embodiment of the invention.

FIG. 4B is a diagram of a telephone having a microphone indicator provided on an extension extending from a side surface of the telephone, according to an embodiment of the invention. According to some embodiments, microphone indicator 140 may be mechanically coupled to an extension which extends from a surface of telephone 100. For example, with reference to FIG. 4B, microphone indicator 140 is mechanically coupled to a distal end of an extension 142. Extension 142 extends from and is mechanically coupled to side surface 104. Microphone indicator 140 may include a substantially flat top and curved sides, and other characteristics as previously discussed. For another example, extension 142 may extend from a user-facing surface 102, such as user-facing surface 102 including display 110 or user-facing surface 102 including keypad 120. Microphone aperture 150 is disposed proximate to extension 142 and/or microphone indicator 140.

Figure 4C:
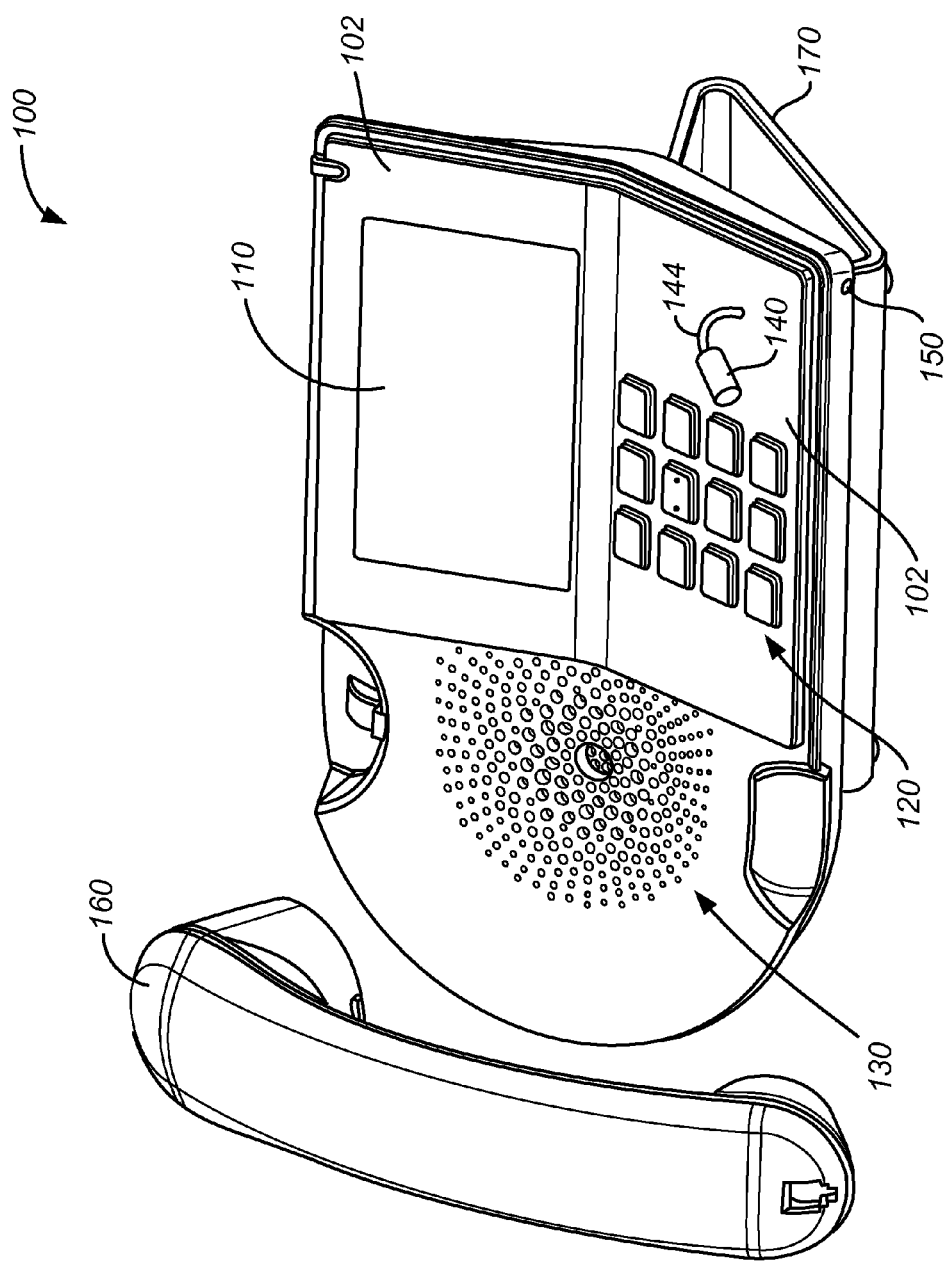
FIG. 4C is a diagram of a telephone having a microphone indicator located on a stalk, according to an embodiment of the invention.

FIG. 4C is a diagram of a telephone having a microphone indicator located on a stalk, according to an embodiment of the invention. According to some embodiments, microphone indicator 140 may be located on a stalk mechanically coupled to a surface of telephone 100. For example, with reference to FIG. 4C, a stalk 144 may be mechanically coupled to user-facing surface 102 including keypad 120. Stalk 144 may be a malleable or non-malleable element mechanically coupled to and extending from user-facing surface 102. Microphone indicator 140 may be mechanically coupled to a distal end of stalk 144. Microphone indicator 140 may include a substantially flat top and curved sides, and other characteristics as previously discussed. For another example, stalk 144 may be located on the user-facing surface 102 including display screen 110. For yet another example, stalk 144 may be located on a side surface 104. Microphone aperture 150 is disposed proximate to microphone indicator 140.

Figure 4D:
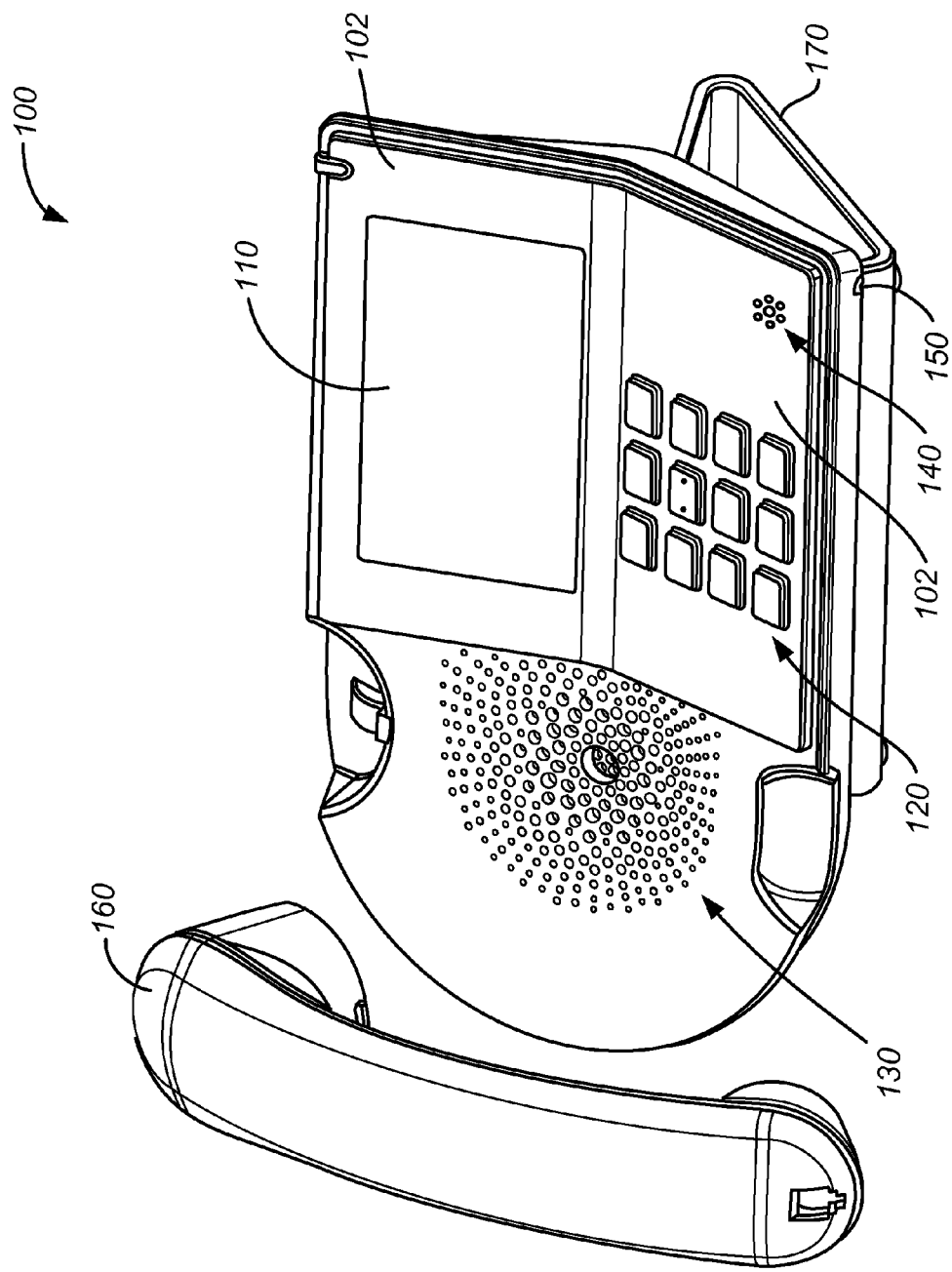
FIG. 4D is a diagram of a telephone having a microphone indicator comprising a plurality of apertures located in a user-facing surface of the telephone, according to an embodiment of the invention.

FIG. 4D is a diagram of a telephone having a microphone indicator comprising a plurality of apertures located in a user-facing surface of the telephone, according to an embodiment of the invention. According to some embodiments, microphone indicator 140 may comprise a plurality of apertures in a surface of telephone 100. For example, with reference to FIG. 4D, microphone indicator 140 may comprise a plurality of apertures in user-facing surface 102 including keypad 120. For another example, microphone indicator 140 may comprise a plurality of apertures in user-facing surface 102 including display screen 110. In some embodiments, the apertures of microphone indicator 140 may have the same characteristics as those previously described with respect to speaker apertures 130. In one embodiment, and with reference to FIG. 4D, an arrangement of apertures of microphone indicator 140 has a substantially smaller diameter than that of an arrangement of speaker apertures 130. Microphone aperture 150 is disposed proximate to the apertures of microphone indicator 140.

Figure 4E:
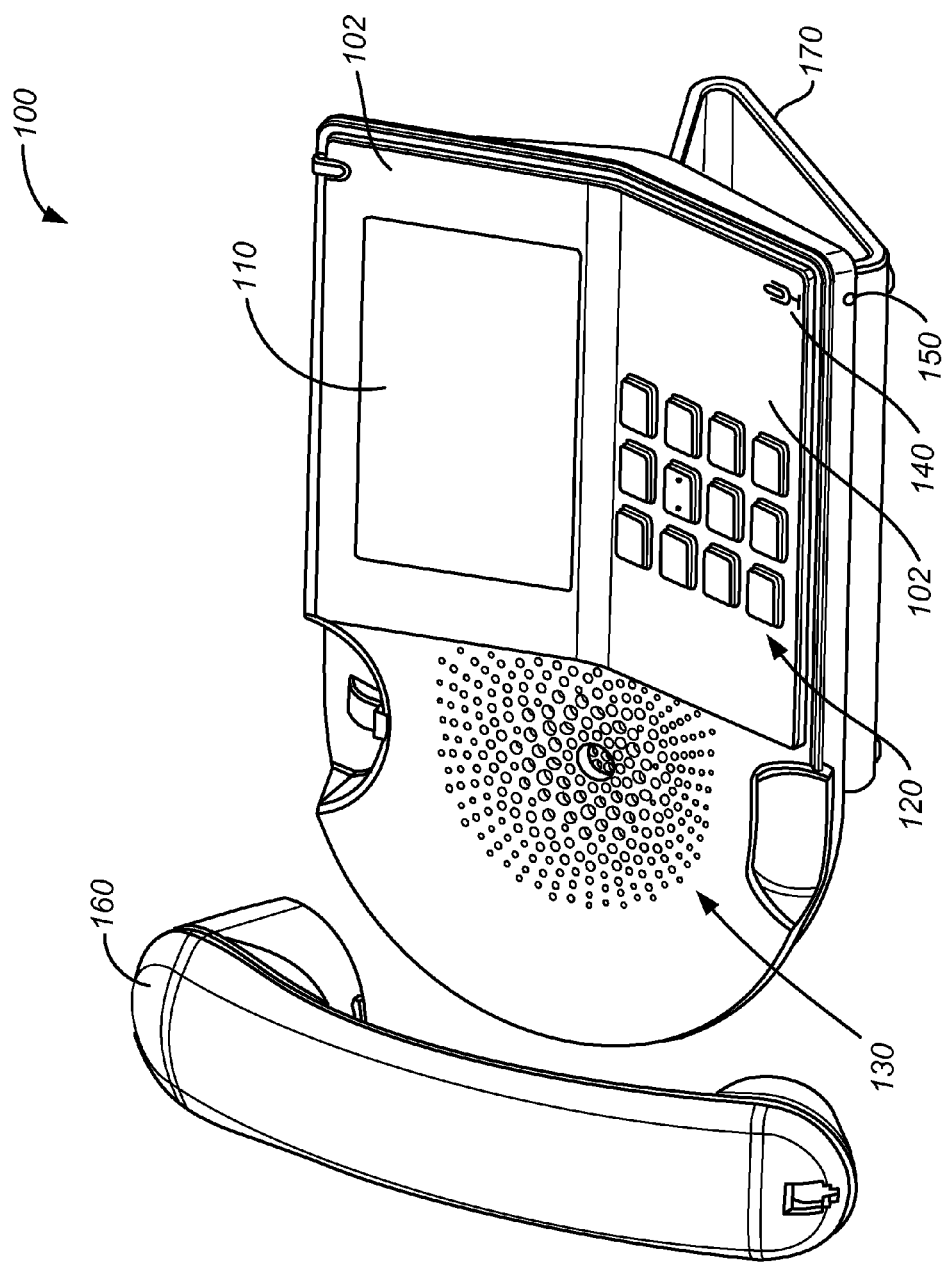
FIG. 4E is a diagram of a telephone having a microphone indicator comprising an image of a microphone located in a user-facing surface of the telephone, according to an embodiment of the invention.

FIG. 4E is a diagram of a telephone having a microphone indicator comprising an image of a microphone located in or on a user-facing surface of the telephone, according to an embodiment of the invention. According to some embodiments, microphone indicator 140 may comprise an image of a microphone provided on, formed in, or etched in a surface of telephone 100. For example, with reference to FIG. 4E, microphone indicator 140 may comprise an image of a microphone provided on user-facing surface 102 including keypad 120. For another example, microphone indicator 140 may comprise an image of a microphone provided on user-facing surface 102 including display screen 110. Microphone aperture 150 is disposed proximate to the image of microphone indicator 140.

Figure 4F:
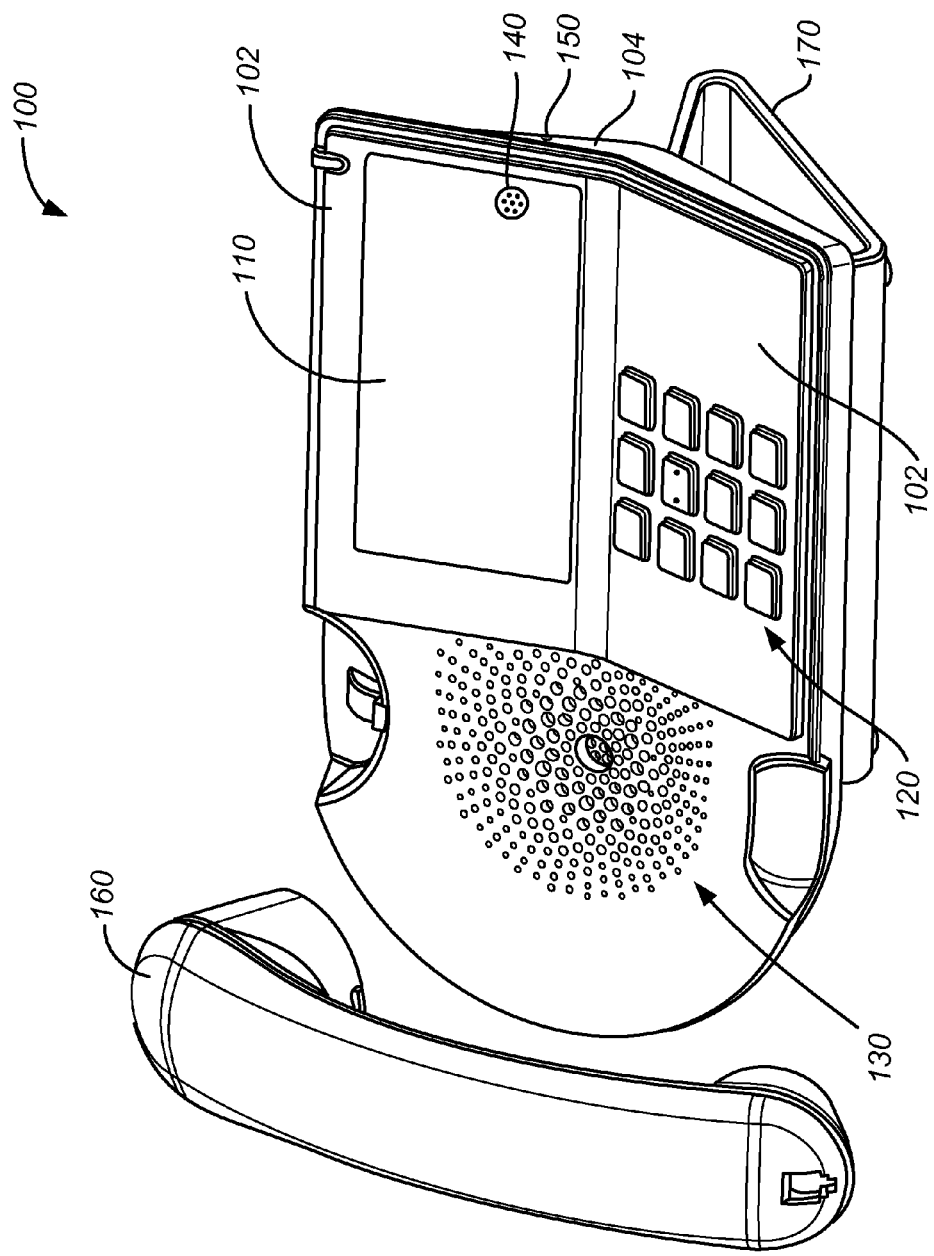
FIG. 4F is a diagram of a telephone having a microphone indicator comprising an electronically generated image of a microphone in a display located in a user-facing surface of the telephone, according to an embodiment of the invention.

FIG. 4F is a diagram of a telephone having a microphone indicator comprising an electronically generated image of a microphone in a display located in a user-facing surface of the telephone, according to an embodiment of the invention. According to some embodiments, microphone indicator 140 may comprise an electronically generated image of a microphone, where the image is electronically generated on the user interface of telephone 100. For example, with reference to FIG. 4F, microphone indicator 140 may comprise an image of a microphone generated by display screen 110. For another example, a display screen may be provided on another user-facing surface 102 of telephone 100, and the microphone may be generated using this display screen. Regardless of where microphone indicator 140 is electronically generated, microphone aperture 150 is disposed proximate to the electronically generally microphone indicator 140. For example, with reference to FIG. 4F, microphone aperture 150 is located on side surface 104 of telephone 100 which is perpendicular and adjacent to display screen 110.

Figure 5A:
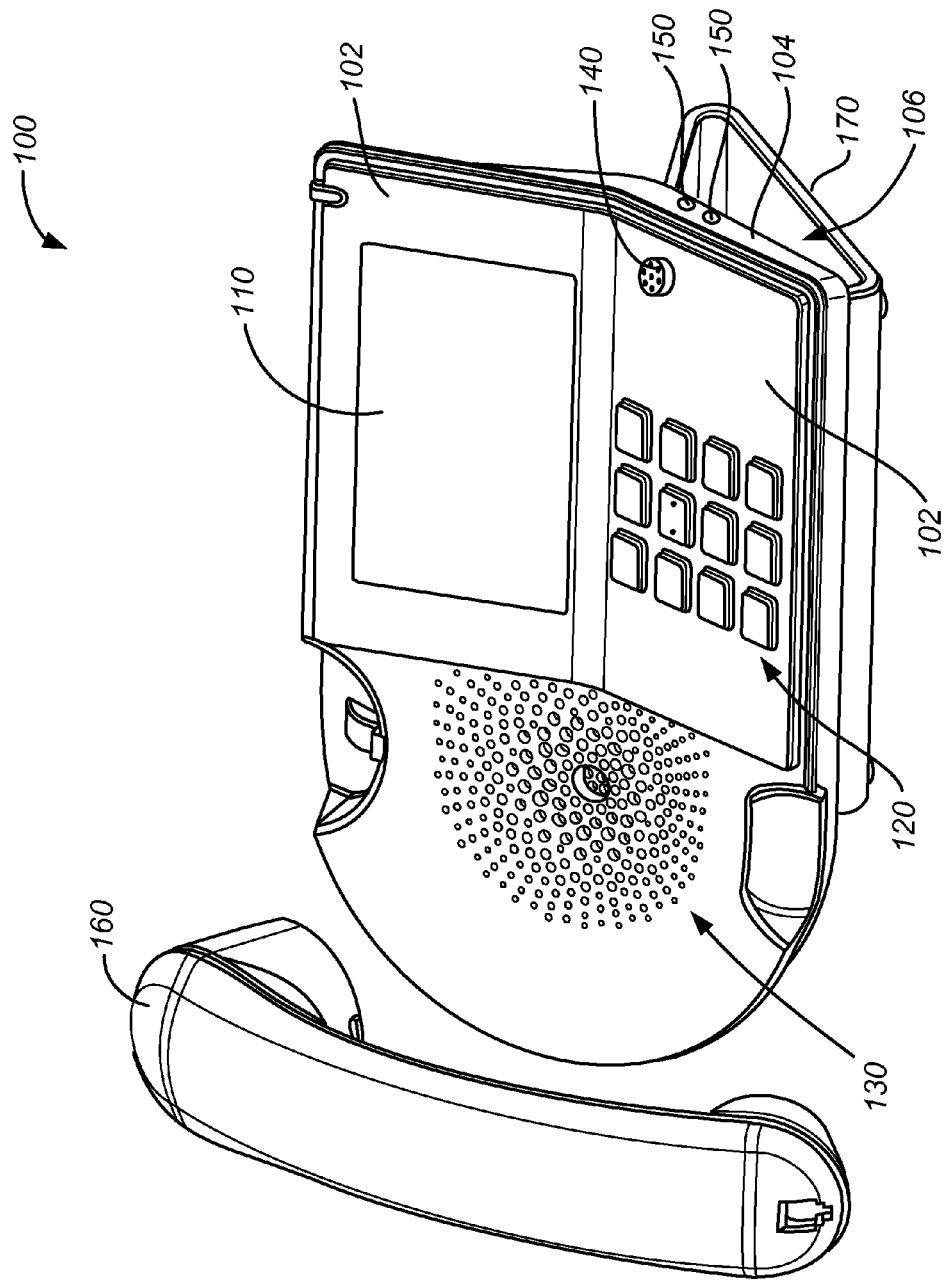
FIG. 5A is a diagram of a telephone having a microphone indicator disposed on a user-facing surface including a keypad, according to an embodiment of the invention.

FIG. 5A is a diagram of a telephone having a microphone indicator disposed on a user-facing surface including a keypad, according to an embodiment of the invention. According to some embodiments, microphone indicator 140 may be partially or fully disposed on any of user-facing surfaces 102. For example, with reference to FIG. 5A, microphone indicator 140 may be fully disposed on user-facing surface 102 including keypad 120. Microphone aperture 150 may be disposed on side-surface 104 proximate to microphone indicator 140. In some embodiments, microphone aperture 150 may be disposed on rear surface 106 and proximate to microphone indicator 140.

According to some embodiments, a plurality of microphone apertures may be provided. The plurality of microphone apertures may be provided on the same surface or on different surfaces. For example, with reference to FIG. 5A, two microphone apertures 150 are provided on side surface 104 proximate to microphone indicator 140. For another example, three or more microphone apertures 150 may be provided on side surface 104. For yet another example, one microphone aperture 150 may be provided on side surface 104, and another microphone aperture (not illustrated) may be provided on rear surface 106.

Figure 5B:
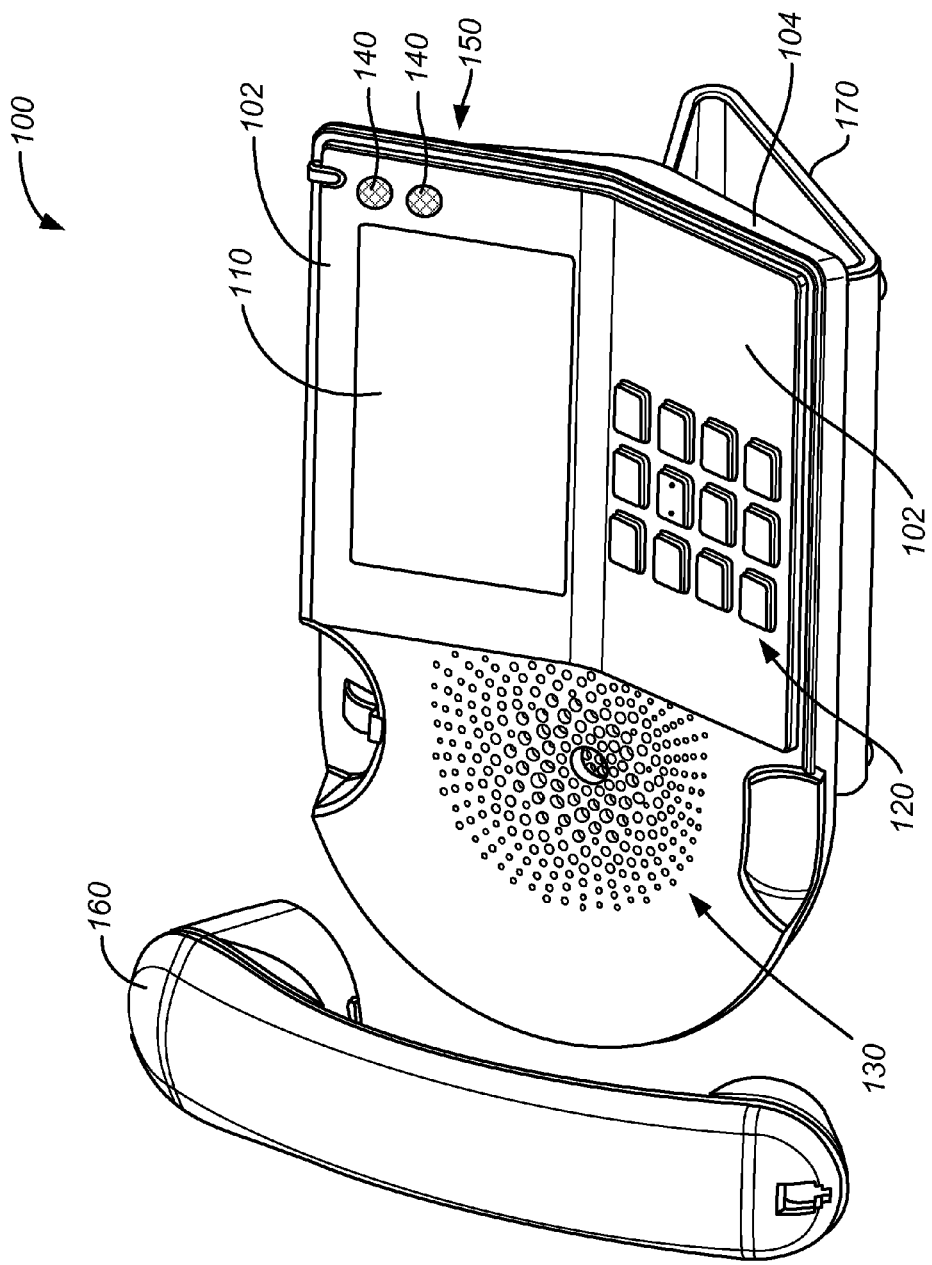
FIG. 5B is a diagram of a telephone having a microphone indicator disposed on a user-facing surface including a display screen, according to an embodiment of the invention.

FIG. 5B is a diagram of a telephone having a microphone indicator disposed on a user-facing surface including a display screen, according to an embodiment of the invention. According to some embodiments, microphone indicator 140 may be partially or fully disposed on any of user-facing surfaces 102. For example, with reference to FIG. 5B, microphone indicator 140 may be fully disposed on user-facing surface 102 including display screen 110. Microphone aperture 150 is disposed on rear surface 106 proximate to microphone indicator 140. In some embodiments, microphone aperture 150 may be disposed on side surface 104 and proximate to microphone indicator 140.

According to some embodiments, a plurality of microphone indicators may be provided. The plurality of microphone indicators may be provided on the same surface or on different surfaces. For example, with reference to FIG. 5B, two microphone indicators 140 are disposed on user-facing surface 102 including display screen. For another example, three or more microphone indicators 140 may be provided on user-facing surface 102. For yet another example, one microphone indicator 140 may be provided on user-facing surface 102, and another (not illustrated) provided on side surface 104. The microphone indicators may be the same or different from one another. For example, one may be similar to that illustrated in FIG. 5B, while another may be similar to that illustrated in FIG. 4C. A microphone aperture is disposed proximate to the plurality of microphone indicators.

According to some embodiments, a plurality of microphone indicators and a plurality of microphone apertures may be provided. As discussed above, the plurality of microphone indicators and plurality of microphone apertures may be provided on the same or different surfaces. The plurality of microphone apertures are disposed proximate to the plurality of microphone indicators.

Figure 6A:
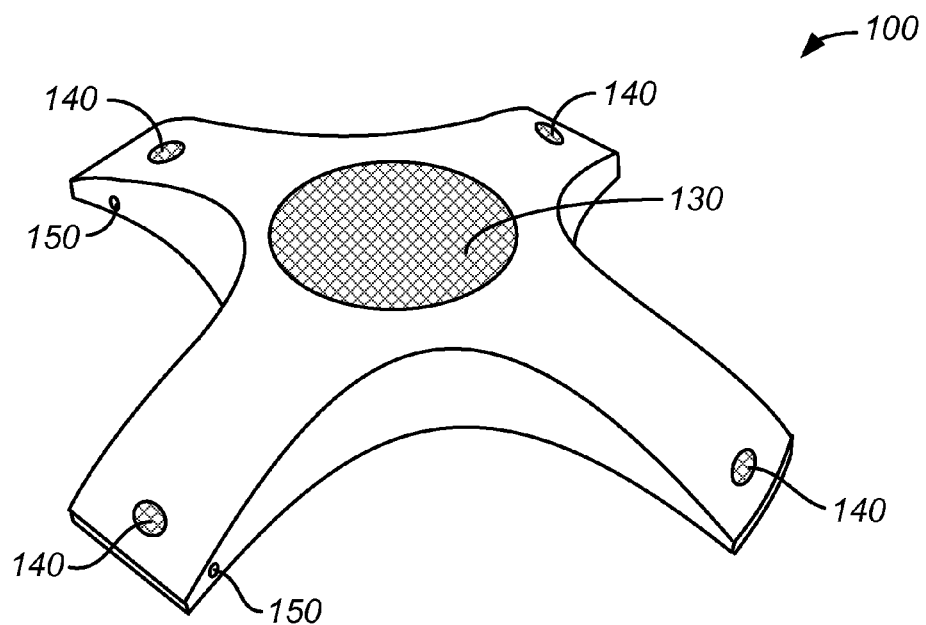
FIG. 6A is a diagram of a telephone having a speaker aperture and a plurality of microphone indicators.

FIG. 6A is a diagram of a telephone having a speaker aperture and a plurality of microphone indicators. According to some embodiments, telephone 100 does not include a user interface. For example, telephone 100 does not include either a keypad or a display. Rather, telephone 100 includes a speaker aperture 130 and one or more microphone indicators 140. Telephone 100 also includes a microphone aperture 150 disposed proximate to each microphone indicator 140. For example, with reference to FIG. 6A, telephone 100 may include four microphone indicators 140 and four corresponding microphone apertures 150, where each microphone aperture 150 is located on a side surface of the telephone proximate to the corresponding microphone indicator 140.

Figure 6B:
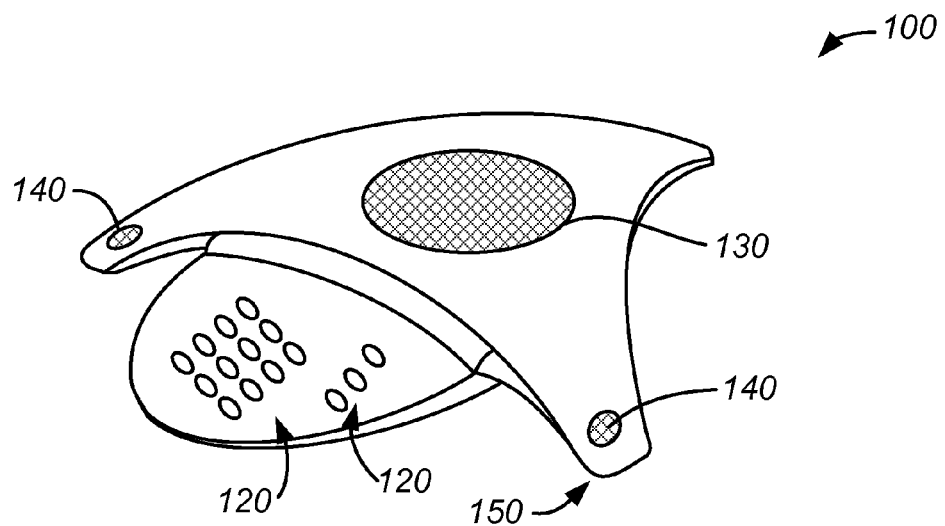
FIG. 6B is a diagram of a telephone having a speaker aperture, a plurality of microphone indicators, and a keypad.

FIG. 6B is a diagram of a telephone having a speaker aperture, a plurality of microphone indicators, and a keypad. According to some embodiments, telephone 100 does not include a display. Rather, telephone 100 includes keypad 120, speaker aperture 130, and one or more microphone indicators 140. Telephone 100 also includes a microphone aperture 150 disposed proximate to each microphone indicator 140. For example, with reference to FIG. 6B, telephone 100 may include three microphone indicators 140 and three corresponding microphone apertures 150, where each microphone aperture 150 is located on a rear surface of the telephone proximate to the corresponding microphone indicator 140.

In some embodiments, telephone 100 may be electrically coupled to a computer (not illustrated). For example, telephone 100 may be coupled to communicate with the computer via a USB connection, serial connection, or the like, or telephone 100 may be coupled to wireless communicate with the computer. The computer may include the functionality of display 110 and/or keypad 120 so as to enable the user to make or receive telephone and/or video calls.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any recitation of "a", "an" or "the" is intended to mean "one or more" or "at least one" unless specifically indicated to the contrary.

What is claimed is:

1. A telephone, comprising:
    a user interface disposed on a user-facing surface of the telephone, the user interface operable to input information from a user and output information to the user;
    a speaker aperture disposed on a surface of the telephone, the speaker aperture operable to allow audio to pass from a speaker disposed in the telephone to the user;
    a microphone indicator disposed along an edge of the user-facing surface of the telephone and extending downward along a side surface of the telephone, the microphone indicator being inoperable to process audio; and
    a microphone aperture disposed proximate to the microphone indicator on a surface of the telephone other than the user-facing surface, the microphone aperture operable to allow audio to pass from the user to a microphone disposed in the telephone, the microphone indicator and the microphone being functionally independent, wherein the microphone indicator is arranged to direct the user to speak in a direction toward the microphone aperture.

2. The telephone of claim 1, wherein the microphone aperture is located on the side surface of the telephone and spaced from a bottom of the microphone indicator.

3. The telephone of claim 1, wherein the microphone aperture is located on a bottom surface of the telephone opposite the user-facing surface of the telephone.

4. The telephone of claim 1, wherein a top of the microphone indicator has a mesh-like surface.

5. The telephone of claim 1, wherein a top of the microphone indicator comprises a plurality of apertures.

6. The telephone of claim 1, wherein the user interface comprises:
    a display screen operable to visually display information to the user; and
    a keypad operable to receive information from the user.

7. The telephone of claim 1, further comprising a handset operable to output audio to the user and receive audio from the user.

8. A telephone, comprising:
    one or more speaker apertures disposed on a surface of the telephone, at least one of the speaker apertures operable to allow audio to pass from a speaker disposed in the telephone to the user;
    a microphone indicator disposed on the user-facing surface of the telephone, the microphone indicator being inoperable to process audio; and
    one or more microphone apertures disposed proximate to the microphone indicator on a surface of the telephone other than the user-facing surface, at least one of the microphone apertures operable to allow audio to pass from the user to a microphone disposed in the telephone, wherein the microphone indicator is arranged to direct the user to speak in a direction toward at least one of the microphone apertures.

9. The telephone of claim 8, wherein the microphone indicator is functionally independent from the microphone.

10. The telephone of claim 8, wherein at least one of the microphone apertures is located on a side surface of the telephone adjacent the user-facing surface of the telephone.

11. The telephone of claim 8, wherein at least one of the microphone apertures is located on a bottom surface of the telephone opposite the user-facing surface of the telephone.

12. The telephone of claim 8, wherein the microphone indicator includes a top disposed along an edge of the user-facing surface and a side extending downward from the top along a side surface of the telephone, the top of the microphone indicator being substantially flat and the side of the microphone indicator being curved and protruding outward from the side surface of the telephone.

13. The telephone of claim 12, wherein the top of the microphone indicator has a mesh-like surface.

14. The telephone of claim 8, wherein the microphone indicator is provided on a stalk that is mechanically coupled to the user-facing surface.

15. The telephone of claim 8, wherein the microphone indicator comprises a plurality of apertures.

16. The telephone of claim 8, wherein the microphone indicator comprises an image of a microphone.

17. The telephone of claim 16, wherein the image is electronically generated and displayed on the user interface.

18. The telephone of claim 8, wherein the microphone indicator is located no more than approximately 10 cm from at least one of the microphone apertures.

19. The telephone of claim 8, further comprising a user interface disposed on a user-facing surface of the telephone, the user interface operable to input information from a user and output information to the user.

20. The telephone of claim 19, wherein the user interface comprises:
    a display screen operable to visually display information to the user; and
    a keypad operable to receive information from the user.

21. The telephone of claim 8, further comprising a handset operable to output audio to the user and receive audio from the user.

22. A telephone, comprising:
    one or more speaker apertures disposed on a surface of the telephone, at least one of the speaker apertures operable to allow audio to pass from a speaker disposed in the telephone to the user;
    a plurality of microphone indicators disposed on the user-facing surface of the telephone, the microphone indicators being inoperable to process audio; and
    a plurality of microphone apertures, each microphone aperture disposed proximate to one of the microphone indicators on a surface of the telephone other than the user-facing surface, each microphone aperture operable to allow audio to pass from the user to at least one microphone disposed in the telephone, wherein the microphone indicators are arranged to direct the user to speak in a direction toward the corresponding microphone aperture.

23. The telephone of claim 22, wherein the microphone indicators are functionally independent from the at least one microphone.

24. The telephone of claim 22, wherein the microphone apertures are located on a side surface of the telephone adjacent the user-facing surface of the telephone.

25. The telephone of claim 22, wherein the microphone apertures are located on a bottom surface of the telephone opposite the user-facing surface of the telephone.

26. The telephone of claim 22, wherein three microphone indicators are provided proximate to three microphone apertures.

27. The telephone of claim 22, wherein four microphone indicators are provided proximate to four microphone apertures.

* * * * *